United States Patent
Aggarwal et al.

(10) Patent No.: US 11,662,717 B2
(45) Date of Patent: May 30, 2023

(54) METHOD AND SYSTEM FOR SECURELY MANAGING OPERATIONS OF A FIELD DEVICE IN AN INDUSTRIAL ENVIRONMENT

(71) Applicants: Hariom Aggarwal, Karnataka (IN); Kishora Reddy I, Karnataka (IN); Harshith Kumar J, Karnataka (IN); Sankujyoti Neog, Karnataka (IN)

(72) Inventors: Hariom Aggarwal, Karnataka (IN); Kishora Reddy I, Karnataka (IN); Harshith Kumar J, Karnataka (IN); Sankujyoti Neog, Karnataka (IN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/400,089

(22) Filed: Aug. 11, 2021

(65) Prior Publication Data
US 2022/0050443 A1    Feb. 17, 2022

(30) Foreign Application Priority Data

Aug. 12, 2020 (EM) .................................. 20190638

(51) Int. Cl.
G05B 19/418 (2006.01)
(52) U.S. Cl.
CPC ..... *G05B 19/4185* (2013.01); *G05B 19/4183* (2013.01); *G05B 19/41835* (2013.01)
(58) Field of Classification Search
CPC ............ G05B 19/4183; G05B 19/4185; G05B 19/41835

(Continued)

(56) References Cited

U.S. PATENT DOCUMENTS

2016/0378090 A1    12/2016   Stanley
2021/0385190 A1*   12/2021   Jasper ..................... H04L 63/20

FOREIGN PATENT DOCUMENTS

EP    2801937 A1    11/2014
EP    3176664 A1     6/2017
WO    2020083630 A1  4/2020

OTHER PUBLICATIONS

Computerhope.com define "environment", 2017. (Year: 2017).*
European Search Report for EP Application No. 20190638.5 dated Jan. 11, 2021, 10 pp.

* cited by examiner

*Primary Examiner* — Hien D Khuu
(74) *Attorney, Agent, or Firm* — Lempia Summerfield Katz LLC

(57) ABSTRACT

A method for securely managing operations of a field device in an industrial environment includes receiving a request to operate the field device from one or more data sources. The request includes information associated with the field device, requestor information, and at least one operation command to be executed on the field device. The method further includes generating one or more control signals to operate the field device based on the received request. Further, the method includes validating the generated one or more control signals based on information related to the field device and proximity of one or more objects with respect to location of the field device. The method includes outputting the generated one or more control signals to at least one field device via a network based on successful validation of the one or more control signals. The outputted one or more control signals operate the field device.

12 Claims, 7 Drawing Sheets

(58) Field of Classification Search
 USPC .......................................................... 700/96
 See application file for complete search history.

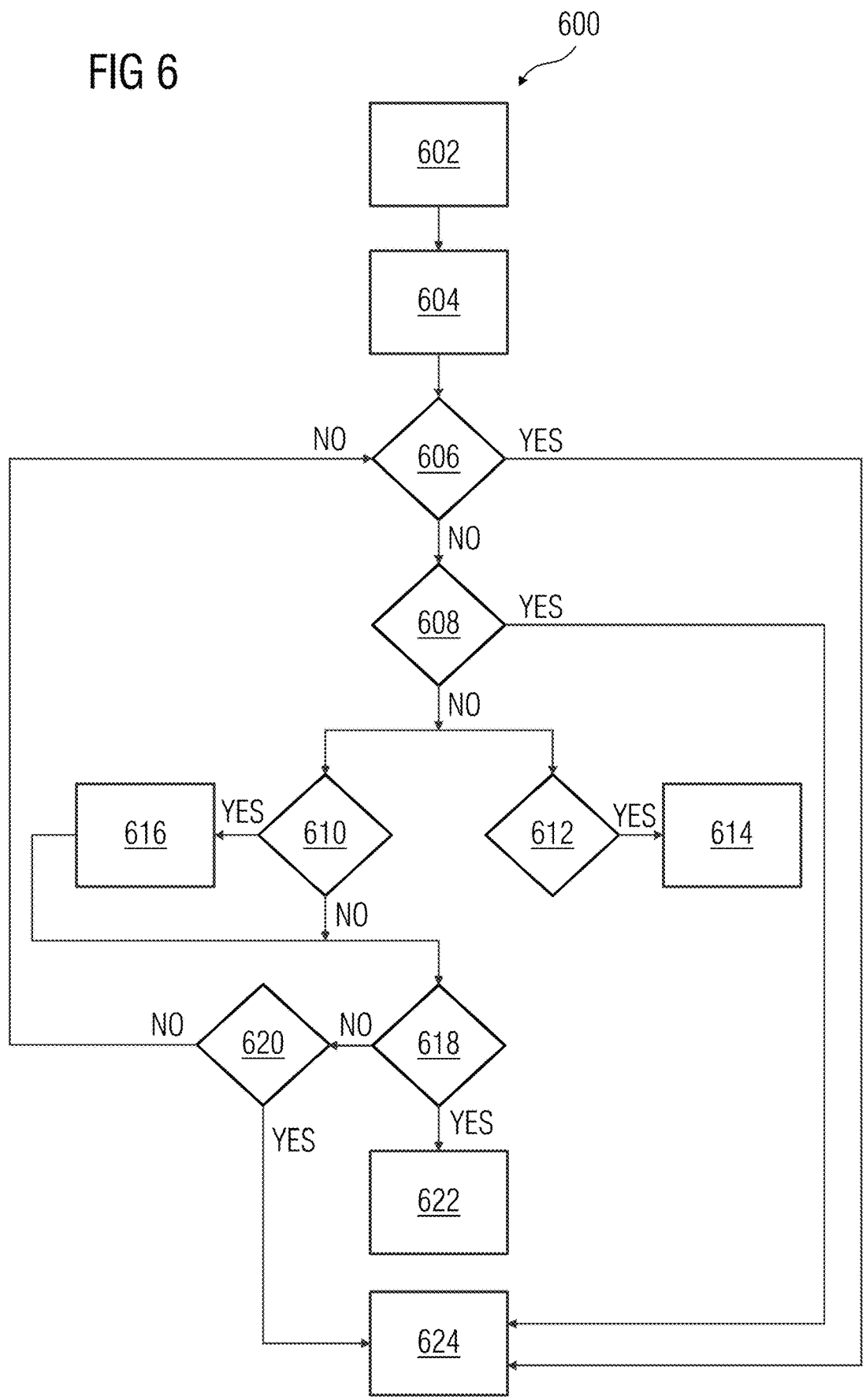

METHOD AND SYSTEM FOR SECURELY MANAGING OPERATIONS OF A FIELD DEVICE IN AN INDUSTRIAL ENVIRONMENT

FIELD DEVICE IN AN INDUSTRIAL ENVIRONMENT

This application claims the benefit of European Patent Application Number EP 20190638.5, filed on Aug. 12, 2020, which is hereby incorporated by reference in its entirety.

BACKGROUND

The present embodiments relate to cloud computing systems and, more particularly, to a method and system for securely managing operations of a field device in an industrial environment.

Typically, process plants or factories are challenged with safety issues during normal plant operations as well as during maintenance. Violation of such safety leads to accidents that may result in fatality, or serious or minor injury to a plant operator. Most accidents occur during maintenance procedures, machinery cleaning, removing items stuck in machinery, or the like. Even with a safety culture employed by most industries, which is mostly administrative control in nature, there is a constant need to implement Engineering Controls to avoid the occupational hazards that may lead to accidents. The most common administrative control procedure used is Safe Work Procedure (SWP), Hazard Identification and Risk Assessment (HIRA), Job Safety Analysis (JSA), and for maintenance work Permit to Work (PTW). Even with so many procedures, guidelines, and protocols in place, most accidents occur due to tedious paper works involved in these systems. Major safety issues such as bypassing safety procedures, production pressure on maintenance/operation team, safety bypass due to overconfidence of field technicians and workers, inadequate job skills, and tasks involving frequent start and stop of machine with multiple agencies working near the vicinity of the machine may be difficult to manage using the existing safety procedures.

Existing safety mechanisms that provide safety to the plant operator for performing a particular task (e.g., operation or maintenance) depends on guidelines, procedures, and protocols laid down by a plant safety administration. Usually, such guidelines, procedures, and protocols are framed based on Occupational Health and Safety Assessment (OHSA) standards. While implementing such guidelines, procedures, and protocols, any controllable machine or equipment is to be shut down before performing any maintenance or operation and safely isolating procedures. This leads to unwanted power consumption/energy source consumption. Also, such procedures require manual locking of the controllable machine or equipment. Even with such proven and established mechanisms, accidents are not eliminated. These systems are as good as the safety awareness to the individuals and are mostly considered as a priority rather than a company value. Hence, usually such safety procedures are less prioritized due to production pressure. In most cases, the responsible supervisor, field technicians, or the workers activate or press the Emergency Stop Push Button (e.g., Hard button) located at the Local Push Button Station (LPBS) in a field near the machine as a way to stop any running or idle equipment/machine from running. The may be the only safety measure to quickly perform their maintenance job. This act leads to occurrence of unexpected safety incidents leading to either malfunctioning of the machines, threat to human life, and unplanned shutdown of the plant.

SUMMARY AND DESCRIPTION

The scope of the present invention is defined solely by the appended claims and is not affected to any degree by the statements within this summary.

In light of above, there is a need for a secured and less complex method and system for managing operations of a field device in an industrial environment.

The present embodiments may obviate one or more of the drawbacks or limitations in the related art. For example, a method and system for managing operations of a field device in an industrial environment may be provided.

In one embodiment, a method for managing operations of a field device in an industrial environment is provided. The method includes receiving a request to operate a field device from one or more data sources. The request includes information associated with the field device, requestor information, and at least one operation command to be executed on the field device. The method further includes generating one or more control signals to operate the field device based on the received request. Further, the method includes validating the generated one or more control signals based on information related to the field device and proximity of one or more objects with respect to location of the field device. Further, the method includes outputting the generated one or more control signals to at least one of the field device via a network based on successful validation of the one or more control signals. The outputted one or more control signals operate the field device as requested.

Further, the method includes controlling the operation of the field device based on the generated one or more control signals. Further, the method includes halting operations of the field device if the validation of the one or more control signals fails. Also, the method includes discarding the received request to operate the field device.

In generating the one or more control signals to operate the field device based on the received request, the method includes detecting one or more events triggered corresponding to the operation of the field device. Further, the method includes determining whether the detected one or more events require validation of operations of the field device. Also, the method includes generating one or more control signals corresponding to the detected one or more events if the detected one or more events require validation of operations of the field device.

In validation of the generated one or more control signals based on information related to the field device and proximity of one or more objects with respect to location of the field device, the method includes determining location of one or more objects in proximity to the location of the field device. The method includes validating whether the determined location of at least one object is in proximity to the location of the field device. Further, the method includes generating an validation failure message if the location of the at least one object is in proximity to the location of the field device. Further, the method includes generating a validation success message if the validation of the determined location of at least one object in proximity to the location of the field device is successful.

In validating the generated one or more control signals based on information related to the field device and proximity of one or more operators with respect to location of the field device, the method includes determining whether there exists at least one interlock function associated with the field device based on a pre stored lookup table. The method includes generating a validation failure message if there exists at least one interlock function associated with the field device and if the location of the at least one object is in proximity to the location of the field device.

Further, the method includes generating an validation success message if at least one interlock function associated with the field device fails to exist and if no locations of the at least one object is in proximity to the location of the field device.

In determining location of one or more objects in proximity to the location of the field device, the method includes receiving real-time location information associated with each of the one or more objects present in a technical installation at a given time. The method includes generating a geographical map of the technical installation including location of one or more field devices. The method further includes superimposing received location information associated with each of the one or more objects present in the technical installation at the given time onto the generated geographical map of the technical installation. Further, the method includes mapping location of each of the one or more objects to corresponding location of one or more field devices based on vicinity. Also, the method includes determining location of one or more objects in proximity to the location of the field device based on the mapping.

In validating whether the determined location of at least one object is in proximity to the location of the field device, the method includes broadcasting a location confirmation request to at least one object having a location that is determined to be in proximity to the location of the field device. The method includes receiving a response message from the broadcasted at least one object. The response message includes at least one location acceptance or location rejection message. Further, the method includes determining whether the received response message includes a location acceptance message. Also, the method includes successfully validating the determined location of the at least one object in proximity to the location of the field device if the received response message includes a location acceptance message. Further, the method includes generating a validation failure message if the received response message includes a location rejection message. Additionally, the method includes discarding the generated one or more control signal and the received request upon generating the validation failure message.

The present embodiments also include a computing system for securely managing operations of a field device in an industrial environment. The computing system includes one or more processors and a memory coupled to the processor. The memory includes an operational safety management module stored in the form of machine-readable instructions executable by the processor. The operational safety management module is configured for performing the method as described above.

The present embodiments also include a cloud computing system including a computing system as described above, at least one engineering system communicatively coupled to the computing system, and a technical installation. The technical installation includes one or more field devices and one or more objects communicatively coupled to the computing system, and the at least one engineering system.

The present embodiments also include a computer-program product (e.g., including a non-transitory computer-readable storage medium) having machine-readable instructions stored therein, that when executed by one or more processors, cause the one or more processors to perform method acts as described above.

BRIEF DESCRIPTION OF THE DRAWINGS

The present invention is further described hereinafter with reference to illustrated embodiments shown in the accompanying drawings, in which:

FIG. 6 is a process flowchart illustrating an exemplary method of managing operations of a field device in an industrial environment, according to another embodiment.

DETAILED DESCRIPTION

Figure 1:
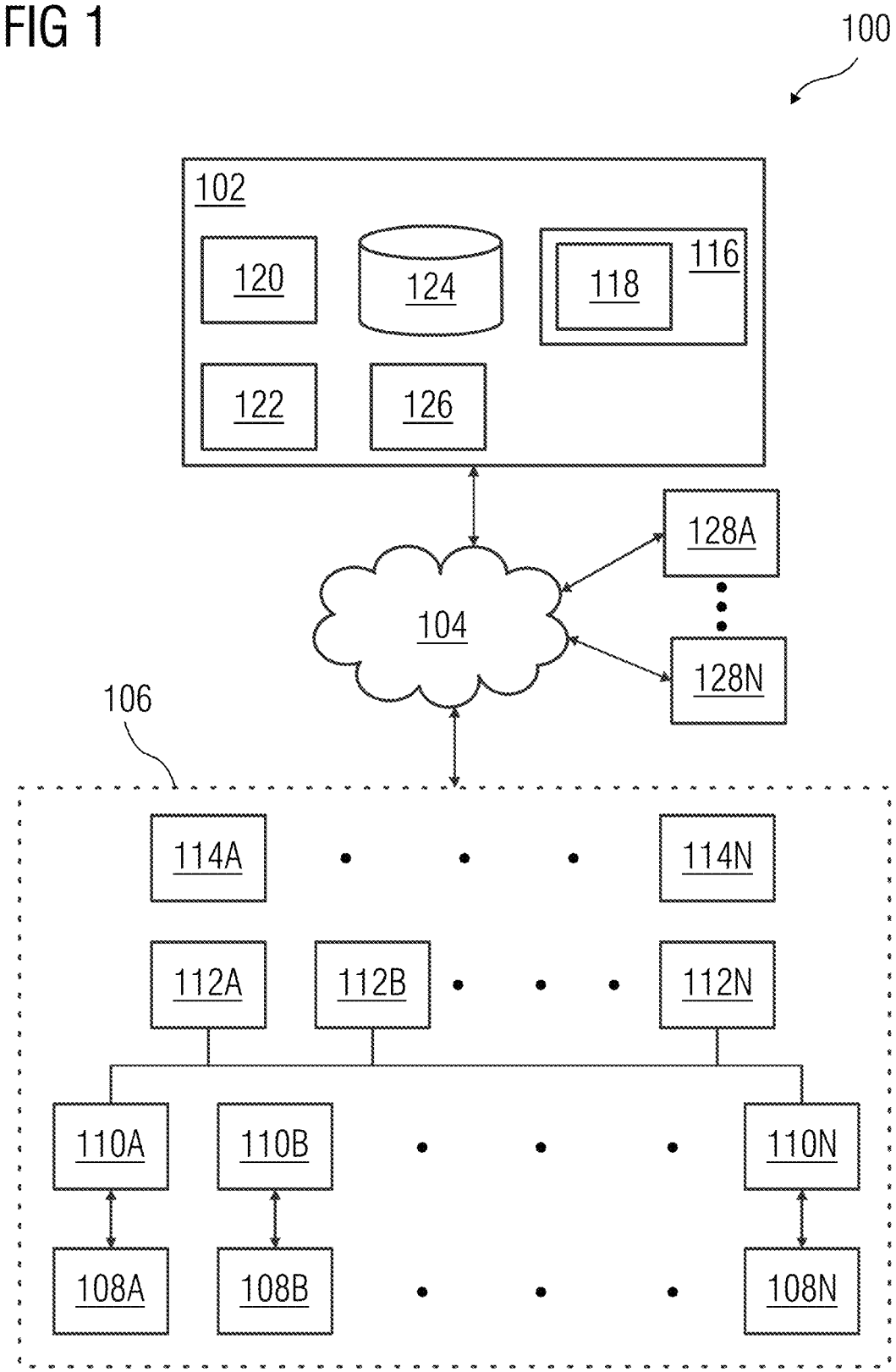
FIG. 1 is a schematic representation of a cloud computing environment capable of managing operations of a field device, according to an embodiment.

Various embodiments are described with reference to the drawings, where like reference numerals are used to refer the drawings and like reference numerals are used to refer to like elements throughout. In the following description, for the purpose of explanation, numerous specific details are set forth in order to provide thorough understanding of one or more embodiments. It may be evident that such embodiments may be practiced without these specific details.

FIG. 1 is a schematic representation of a cloud computing environment 100 capable of managing operations of a field device 108A-N, according to an embodiment. For example, FIG. 1 depicts a cloud computing system 102 that is capable of delivering cloud applications for managing a technical installation 106. As used herein, "cloud computing environment" or "industrial environment" refers to a processing environment including configurable computing physical and logical resources such as, for example, networks, servers, storage, applications, services, etc., and data distributed over the cloud platform. The cloud computing environment 100 provides on-demand network access to a shared pool of the configurable computing physical and logical resources. In an embodiment, the technical installation 106 may include a plant or an industry.

The technical installation 106 includes one or more field devices 108A-N communicatively connected to at least one of motor control cubicle (MCC), power control cubicle (PCC), or sub control systems 110A-N. Each of the at least one motor control cubicle (MCC), power control cubicle (PCC), or sub control systems 110A-B is further connected to a local push button station (LPBS) 112A-N. The technical installation 106 also includes one or more objects 114A-N in vicinity of at least one field device 108A-N. The one or more objects 114A-N may be a proximity sensor, an object, any kind of obstacle, another field device, and the like. An object may be a device associated with an operator, which may be a handheld device, a wearable device, a PC, a tablet, a computer, or the like.

The cloud computing system 102 is connected to the one or more field devices 108A-N in the technical installation 106 via a network 104 (e.g., Internet). The one or more field devices 108A-N may include servers, robots, switches, automation devices, programmable logic controllers (PLC)s, human machine interfaces (HMIs), motors, valves, pumps, actuators, sensors and other industrial equipment(s). The cloud computing system 102 may be a public cloud, a private cloud, and/or a hybrid cloud configured to provide dedicated cloud services to users of the cloud computing system 102. Although, FIG. 1 illustrates the cloud computing system 102 connected to one technical installation 106, one skilled in the art may envision that the cloud computing system 102 may be connected to several technical installations 106 located at different locations via the network 104.

Further, the cloud computing system 102 is also connected to engineering systems 128A-N via the network 104. The engineering systems 128A-N may access the cloud computing system 102 for automatically managing industrial operations. In an embodiment, the engineering systems 128A-N includes an engineering device capable of running an industrial automation application (also referred as 'engineering application' or 'engineering tool' herein). The engineering systems 128A-N may be a laptop computer, desktop computer, tablet computer, smartphone, and the like. The engineering systems 128A-N may access cloud applications (e.g., providing performance visualization of the one or more field devices(s) 108A-N) via a web browser.

Throughout the specification, the terms "user devices" and "engineering systems" are used interchangeably.

The cloud computing system 102 includes a cloud platform 116, an operational safety management module 118, a server 120 including hardware resources and an operating system (OS), a network interface 122, and a database 124. The network interface 122 enables communication between the cloud computing system 102, the technical installation 106, and the one or more engineering systems 128A-N. Also, the network interface 122 enables communication between the cloud computing system 102 and the one or more engineering systems 128A-N. The cloud interface (not shown in FIG. 1) may allow the engineers at the one or more engineering systems 128A-N to access engineering project files stored at the cloud computing system 102 and perform one or more actions on the engineering project files as same instance. The server 120 may include one or more servers on which the OS is installed. The servers 120 may include one or more processors, one or more storage devices, such as, memory units, for storing data and machine-readable instructions (e.g., applications and application programming interfaces (APIs) 126), and other peripherals required for providing cloud computing functionality. The cloud platform 116 is a platform that enables functionalities such as data reception, data processing, data rendering, data communication, etc. using the hardware resources and the OS of the servers 120 and delivers the aforementioned cloud services using the application programming interfaces 126 deployed therein. The cloud platform 116 may include a combination of dedicated hardware and software built on top of the hardware and the OS.

The database 124 stores the information relating to the technical installation 106 and the one or more engineering systems 128A-N. The database 124 is, for example, a structured query language (SQL) data store or a not only SQL (NoSQL) data store. The database 124 is configured as cloud-based database implemented in the cloud computing environment 100, where computing resources are delivered as a service over the cloud platform 116. The database 124, according to another embodiment, is a location on a file system directly accessible by the operational safety management system 118. The database 124 is configured for storing the generated one or more control signals, validation results, validation results, location information of the field device 108A-N, location information of the objects 114A-N, geographical map, location acceptance request, response messages, interlock function, one or more events, operations of the field device 108A-N, and the like.

Figure 2:
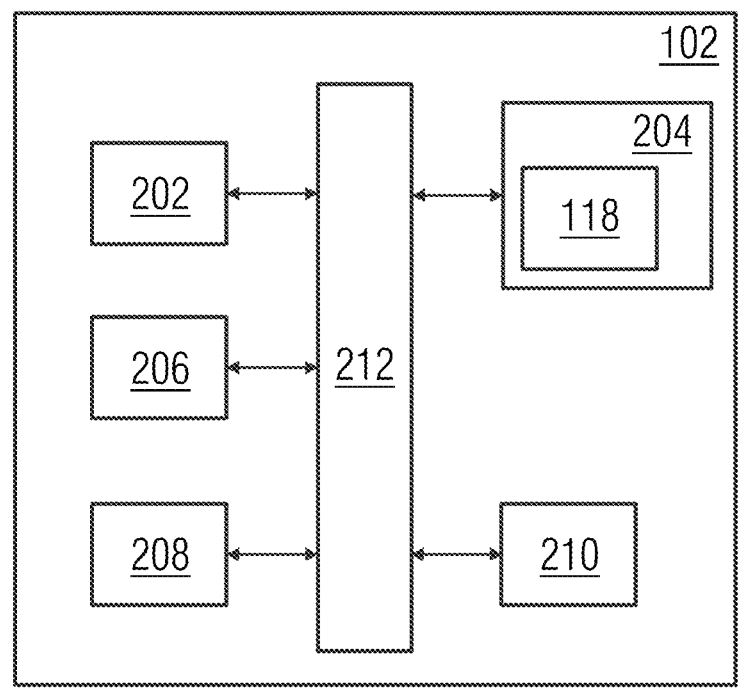
FIG. 2 is a block diagram of a computing system, such as those shown in FIG. 1, in which an embodiment may be implemented.

FIG. 2 is a block diagram of a cloud computing system 102, such as those shown in FIG. 1, in which an embodiment may be implemented. In FIG. 2, the cloud computing system 102 includes one or more processors 202, an accessible memory 204, a communication interface 206, an input-output unit 208, and a bus 210.

The one or more processors 202, as used herein, may be any type of computational circuit, such as, but not limited to, a microprocessor unit, microcontroller, a complex instruction set computing microprocessor unit, a reduced instruction set computing microprocessor unit, a very long instruction word microprocessor unit, an explicitly parallel instruction computing microprocessor unit, a graphics processing unit, a digital signal processing unit, or any other type of processing circuit. The one or more processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more processors 202, such as being a computer-readable storage medium. The one or more processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes an operational safety management module 118 stored in the form of machine-readable instructions on any of the above-mentioned storage media and may be in communication with and executed by the one or more processors 202.

When executed by the one or more processors 202, the operational safety management module 118 causes the one or more processors 202 to manage operations of a field device 108A-N in the industrial environment 100. In an embodiment, the operational safety management module 118 causes the one or more processors 202 to receive a request to operate a field device 108A-N from one or more data sources. The request includes information associated with the field device 108A-N, requestor information, and at least one operation command to be executed on the field device 108A-N. Further, the operational safety management module 118 causes the one or more processors 202 to generate one or more control signals to operate the field device 108A-N based on the received request. Further, the operational safety management module 118 causes the one or more processors 202 to validate the generated one or more control signals based on information related to the field device 108A-N and proximity of one or more objects 114A-N with respect to location of the field device (108A-N). Also, the operational safety management module 118 causes the one or more processors 202 to output the generated one or more control signals to at least one of the field device 108A-N via a network 104 based on successful validation of the one or more control signals. The outputted one or more control signals operate the field device 108A-N as requested.

The operational safety management module 118 causes the one or more processors 202 to control the operation of the field device 108A-N based on the generated one or more control signals. Further, the operational safety management module 118 causes the one or more processors 202 to halt operations of the field device 108A-N if the validation of the one or more control signals fails. Also, the operational safety management module 118 causes the one or more processors 202 to discard the received request to operate the field device 108A-N.

In generating the one or more control signals to operate the field device 108A-N based on the received request, the operational safety management module 118 causes the one or more processors 202 to detect one or more events triggered corresponding to the operation of the field device 108A-N. Further, the operational safety management module 118 causes the one or more processors 202 to determine whether the detected one or more events require validation of operations of the field device 108A-N. Also, the operational safety management module 118 causes the one or more processors 202 to generate one or more control signals corresponding to the detected one or more events if the detected one or more events require validation of operations of the field device 108A-N.

In validating the generated one or more control signals based on information related to the field device 108A-N and proximity of one or more objects 114A-N with respect to location of the field device 108A-N, the operational safety management module 118 causes the one or more processors 202 to determine location of one or more objects 114A-N in proximity to the location of the field device 108A-N. Further, the operational safety management module 118 causes the one or more processors 202 to validate whether the determined location of at least one object 114A-N is in proximity to the location of the field device 108A-N. Also, the operational safety management module 118 causes the one or more processors 202 to generate a validation failure message if the location of the at least one object 114A-N is in proximity to the location of the field device 108A-N. Alternatively, the operational safety management module 118 causes the one or more processors 202 to generate an validation success message if the validation of the determined location of at least one object 114A-N in proximity to the location of the field device 108A-N is successful.

In validating the generated one or more control signals based on information related to the field device 108A-N and proximity of one or more operators with respect to location of the field device 108A-N, the operational safety management module 118 causes the one or more processors 202 to determine whether there exists at least one interlock function associated with the field device 108A-N based on a pre stored lookup table. Further, the operational safety management module 118 causes the one or more processors 202 to generate a validation failure message if there exist at least one interlock function associated with the field device 108A-N and if the location of the at least one object 114A-N is in proximity to the location of the field device 108A-N. Alternatively, the operational safety management module 118 causes the one or more processors 202 to generate a validation success message if at least one interlock function associated with the field device 108A-N fails to exist and if no location of the at least one object 114A-N is in proximity to the location of the field device 108A-N.

In determining location of one or more objects 114A-N in proximity to the location of the field device 108A-N, the operational safety management module 118 causes the one or more processors 202 to receive real-time location information associated with each of the one or more objects 114A-N present in a technical installation 106 at a given time. Further, the operational safety management module 118 causes the one or more processors 202 to generate a geographical map of the technical installation 106 including location of one or more field devices 108A-N. Also, the operational safety management module 118 causes the one or more processors 202 to superimpose received location information associated with each of the one or more objects 114A-N present in the technical installation 106 at the given time onto the generated geographical map of the technical installation 106. Further, the operational safety management module 118 causes the one or more processors 202 to map location of each of the one or more objects 114A-N to corresponding location of one or more field devices 108A-N based on vicinity. Additionally, the operational safety management module 118 causes the one or more processors 202 to determine location of one or more objects 114A-N in proximity to the location of the field device 108A-N based on the mapping.

In validating whether the determined location of at least one object 114A-N is in proximity to the location of the field device 108A-N, the operational safety management module 118 causes the one or more processors 202 to broadcast a location confirmation request to at least one object 114A-N having a location that is determined to be in proximity to the location of the field device 108A-N. Further, the operational safety management module 118 causes the one or more processors 202 to receive a response message from the broadcasted at least one object 114A-N. The response message includes at least one of location acceptance or location rejection message. Further, the operational safety management module 118 causes the one or more processors 202 to determine whether the received response message includes a location acceptance message. Also, the operational safety management module 118 causes the one or more processors 202 to successfully validate the determined location of the at least one object 114A-N in proximity to the location of the field device 108A-N if the received response message includes a location acceptance message.

Further, the operational safety management module 118 causes the one or more processors 202 to generate a validation failure message if the received response message includes a location rejection message. Also, the operational safety management module 118 causes the one or more processors 202 to discard the generated one or more control signal and the received request upon generating the validation failure message.

The communication interface 206 is configured for establishing communication sessions between the one or more engineering systems 128A-N and the cloud computing system 102. The communication interface 206 allows the one or more engineering applications running on the engineering systems 128A-N to manage operations of a field device 108A-N. In an embodiment, the communication interface 206 interacts with the interface at the one or more engineering systems 128A-N for allowing the engineers to perform one or more actions on the field device 108A-N.

The input-output unit 208 may include input devices such as, for example, a keypad, a touch-sensitive display, a camera (e.g., a camera receiving gesture-based inputs), etc.

capable of receiving one or more input signals, such as user commands to process engineering operations. Also, the input-output unit 208 may be a display unit for displaying a graphical user interface that visualizes the progress of operations and also displays the status information associated with each set of actions performed on the field device 108A-N. The bus 210 acts as an interconnect between the processor 202, the memory 204, and the input-output unit 208.

Those of ordinary skilled in the art will appreciate that the hardware depicted in FIG. 2 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter may also be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a cloud computing system 102 as is unique to the present disclosure or necessary for an understanding of the present disclosure is depicted and described. The remainder of the construction and operation of the cloud computing system 102 may conform to any of the various current implementation and practices known in the art.

Figure 3:
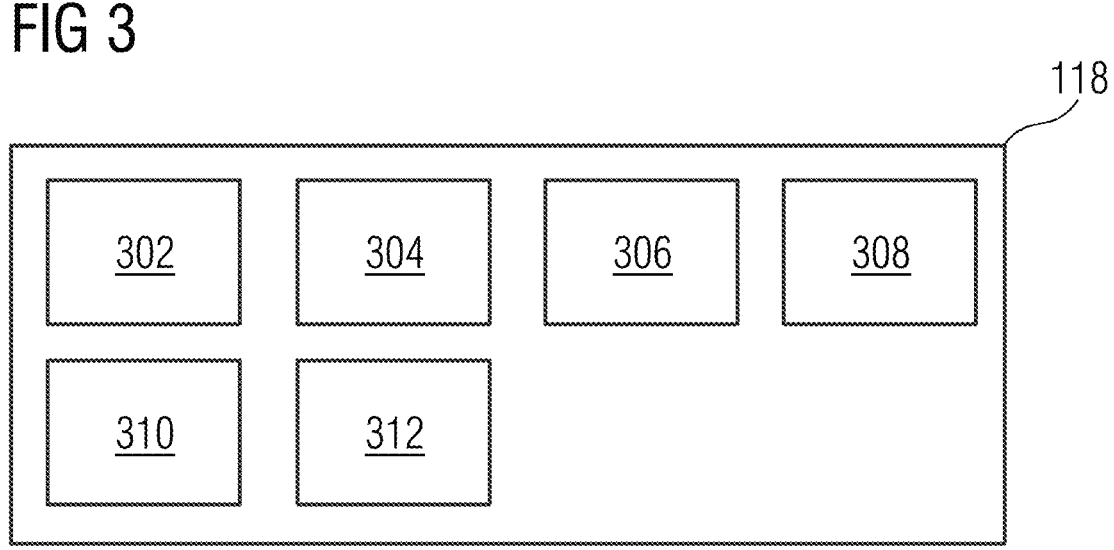
FIG. 3 is a block diagram of an operational safety management module, such as those shown in FIG. 1 and FIG. 2, in which an embodiment may be implemented.

FIG. 3 is a block diagram of an operational safety management module 118, such as those shown in FIG. 1 and FIG. 2, in which an embodiment may be implemented. In FIG. 3, the operational safety management module 118 includes a receiver module 302, a control signal generation module 304, a validation module 306, a control module 308, an output module 310, and a database 312.

The receiver module 302 is configured for receiving a request to operate a field device 108A-N from one or more data sources. The request includes information associated with the field device 108A-N, requestor information, and at least one operation command to be executed on the field device 108A-N. The operation command may include, for example, a start command, a stop command, a reset command, start forward, start reverse, and the like. The one or more data sources may be one or more engineering systems 128A-N, a MCC/PCC system 110A-N, any external data sources or internal data sources such as IO module, programmable logic controllers (PLCs), and the like. The one or more engineering systems 128A-N include a distributed control system.

The control signal generation module 304 is configured for generating one or more control signals to operate the field device 108A-N based on the received request. The one or more control signals may be start and/or stop. Specifically, in generating the one or more control signals to operate the field device 108A-N based on the received request, the control signal generation module 304 is configured for detecting one or more events triggered corresponding to the operation of the field device 108A-N. The one or more events includes activating local push button station, triggering a notification from one or more data sources, initiating a start operation command, and the like. Further, the control signal generation module 304 is configured to determine whether the detected one or more events require validation of operations of the field device 108A-N. For example, if the detected event is an activity classified to be normal, then such activity is determined as not requiring validation. On the contrary, if the detected event is an abnormal, faulty, rare, unused, maintenance related activity then such activity is determined as requiring validation. Further, the control signal generation module 304 is configured for generating one or more control signals corresponding to the detected one or more events if the detected one or more events require validation of operations of the field device 108A-N. For example, if the detected event is an activation of local push button to start a field device 108A-N, then such event is determined to be requiring validation and a corresponding control signal such as "start device" is generated.

The validation module 306 is configured for validating the generated one or more control signals based on information related to the field device 108A-N and proximity of one or more objects 114A-N with respect to location of the field device 108A-N. The information related to the field device 108A-N includes location of the field device 108A-N, operation condition of the field device 108A-N, video stream of real time scenes capturing field device 108A-N and a surrounding environment, and the like. The proximity of the one or more objects 114A-N with respect to location of the field device 108A-N includes an average distance between the field device 108A-N and one or more objects 114A-N nearby. The one or more objects 114A-N may be a proximity sensor, an object, any kind of obstacle, another field device, and the like. An object may be a device associated with an operator, which may be handheld device, a wearable device, a PC, a tablet, a computer, or the like. The validation is performed in two levels (e.g., level one including validation of location and level two including validation of any interlock associated with the field device 108A-N). Specifically, in level one of validation, in validating the generated one or more control signals based on information related to the field device 108A-N and proximity of one or more objects 114A-N with respect to location of the field device 108A-N, the validation module 306 is configured for determining location of one or more objects 114A-N in proximity to the location of the field device 108A-N.

In order to determine the location of the one or more objects 114A-N in proximity to the location of the field device 108A-N, the validation module 306 is configured for receiving real-time location information associated with each object of the one or more objects 114A-N present in a technical installation 106 at a given time. For example, if there are N objects 11A-N in the technical installation 106, then location corresponding to all N objects 108A-N is determined. This may be achieved using any known location detection mechanism such as Global Positioning systems. Further, the validation module 306 is configured for generating a geographical map of the technical installation 106 including location of one or more field devices 108A-N. The geographical map includes location of the one or more field devices 108A-N inside the technical installation. For example, the geographical map may be an industrial plant layout. Further, the validation module 306 periodically updates the geographical map with real time location of the field device 108A-N and the objects 114A-N (e.g., updating the changes in user location such as if a user enters or leaves the area). Also, the validation module 306 is configured for superimposing received location information associated with each of the one or more objects 114A-N present in the technical installation 106 at the given time onto the generated geographical map of the technical installation 106. Hence, the geographical map includes location of the one or more objects 114A-N and the location of the field devices 108A-N. Also, the validation module 306 is configured for mapping location of each of the one or more objects 114A-N to corresponding location of one or more field devices 108A-N based on vicinity. Each of the objects 114A-N in the technical installation 106 is mapped to one or the other field device 108A-N. Also, a time-out duration for receiving the responses that is configurable is also mapped to each of the requests broadcasted. Also, the validation module 306 is configured for determining location of one or more objects 114A-N in proximity to the location of the field device 108A-N based on the mapping. For example, near to a field device 108A-N, there may be 'p' objects 114A-N nearby.

Upon determining the location, the validation module 306 is configured for validating whether the determined location of at least one object 114A-N is in proximity to the location of the field device 108A-N. Specifically, the validation module 306 is configured for broadcasting a location confirmation request to at least one object 114A-N) having a location that is determined to be in proximity to the location of the field device 108A-N. For example, a location acceptance request is sent for all 'p' objects 114A-N in proximity to the field device 108A, for example. The users of the objects 114A-N may either confirm or reject the location acceptance request via a response message. The validation module 306 is configured for receiving a response message from the broadcasted at least one object 114A-N. The response message includes a location acceptance or location rejection message. Further, the validation module 306 is configured for determining whether the received response message includes a location acceptance message. Also, the validation module 306 is configured for successfully validating the determined location of the at least one object 114A-N in proximity to the location of the field device 108A-N if the received response message includes a location acceptance message. Alternatively, if the received response message includes a location rejection message, then the validation module 306 is configured for generating a validation failure message. In this case, the validation module 306 is configured for discarding the generated one or more control signal and the received request upon generating the validation failure message.

Upon validation, the validation module 306 is configured for generating an validation failure message if the location of the at least one object 114A-N is in proximity to the location of the field device 108A-N. Alternatively, the validation module 306 is configured for generating a validation success message if the validation of the determined location of at least one object 114A-N in proximity to the location of the field device 108A-N is successful. In other words, if none of the at least one object 114A-N is in proximity to the location of the field device 108A-N, this provides that all users are in a safe zone and the field device may be now safely operated. Until this stage, the generated control signal may have completed first level of validation.

A second level or subsequent level of validation includes interlock level validation. In this level, the validation module 306 is configured for determining whether there exists at least one interlock function associated with the field device 108A-N based on a pre stored lookup table. Further, the validation module 306 is configured for generating a validation failure message if there exists at least one interlock function associated with the field device 108A-N and if the location of the at least one object 114A-N is in proximity to the location of the field device 108A-N. Alternatively, the validation module 306 is configured for generating a validation success message if at least one interlock function associated with the field device 108A-N fails to exist and if no locations of the at least one object 114A-N is in proximity to the location of the field device 108A-N.

The control module 308 is configured for controlling the operation of the field device 108A-N based on the generated one or more control signals. The operation of the field device 108A-N may be performing one or more control actions such as starting the machine, stopping the machine, halting the machine, changing the configuring parameters, and the like. Further, the control module 308 is configured for halting operations of the field device 108A-N if the validation of the one or more control signals fails. Further, the control module 308 is configured for discarding the received request to operate the field device 108A-N.

The output module 310 is configured for outputting the generated one or more control signals to at least one of the field device 108A-N via a network 104 based on successful validation of the one or more control signals. The outputted one or more control signals operate the field device 108A-N as requested. For example, if the generated one or more control signals indicate "starting device", then such control signal is outputted. Further, the output module 310 may be displayed on a user interface of engineering system 128A-N. The output module 310 is further configured for transmitting the generated control signals to the field devices 108A-N.

The database 312 is configured for storing the generated one or more control signals, validation results, location information of the field device 108A-N, location information of the objects 114A-N, geographical map, location acceptance request, response messages, interlock functions, one or more events, operations of the field device 108A-N, and the like.

In operation, a control signal (e.g., a start command) is triggered to the field device 108A. The operational safety management module 118 broadcasts start request to all handheld-devices of users or operators in the vicinity of the field device 108A. All users then provides a respective response (e.g., Accept or Reject) that is sent back to the operational safety management module 118. The user accepts the request if the user is in safe-zone and rejects the request if the user is in the danger-zone. The operational safety management module 118 evaluates the responses received from all the users in the vicinity of that field device 108A. If all users accept that they are in safe-zone, the start command is outputted to the field device 108A. If any user rejects the request, the start operation is canceled.

Figure 4A:
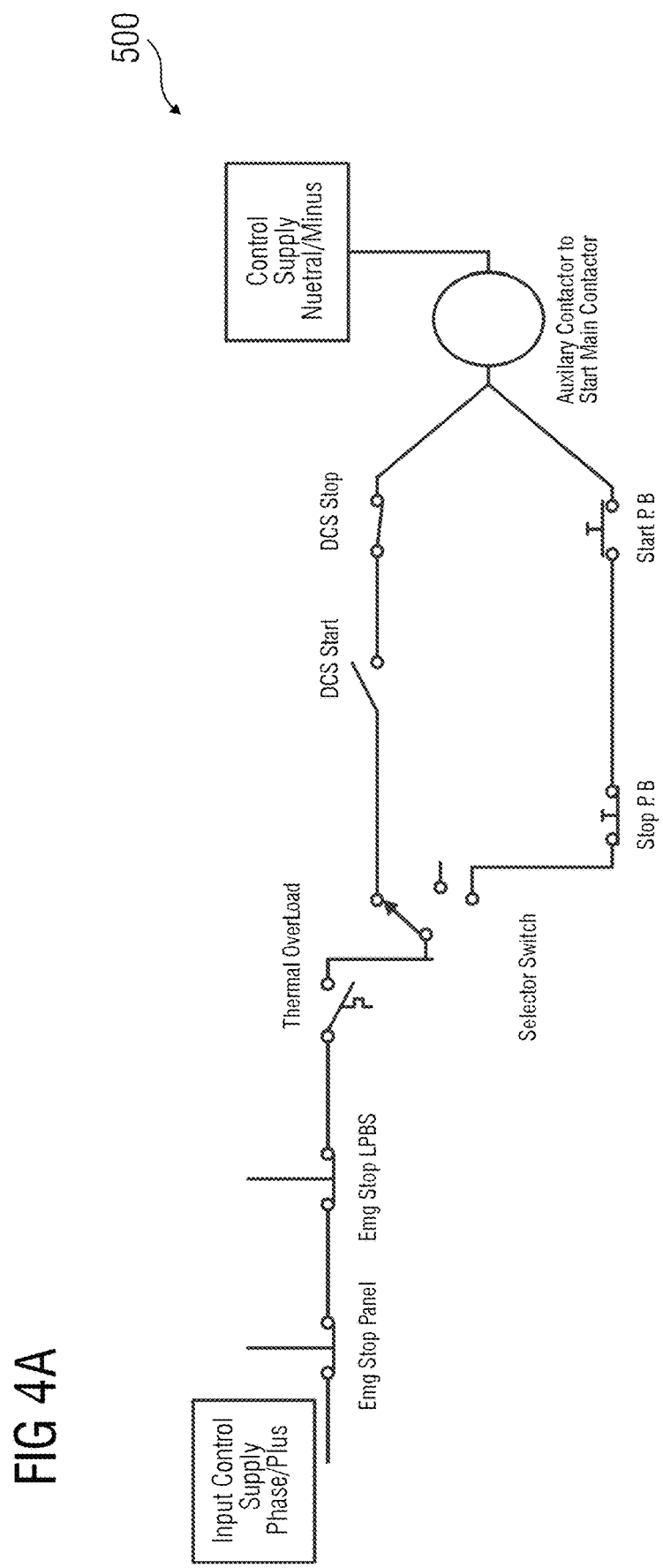
FIGS. 4A-B illustrate an electrical circuit layout illustrating a method of managing operations of a field device, according to an embodiment.
Figure 4B:
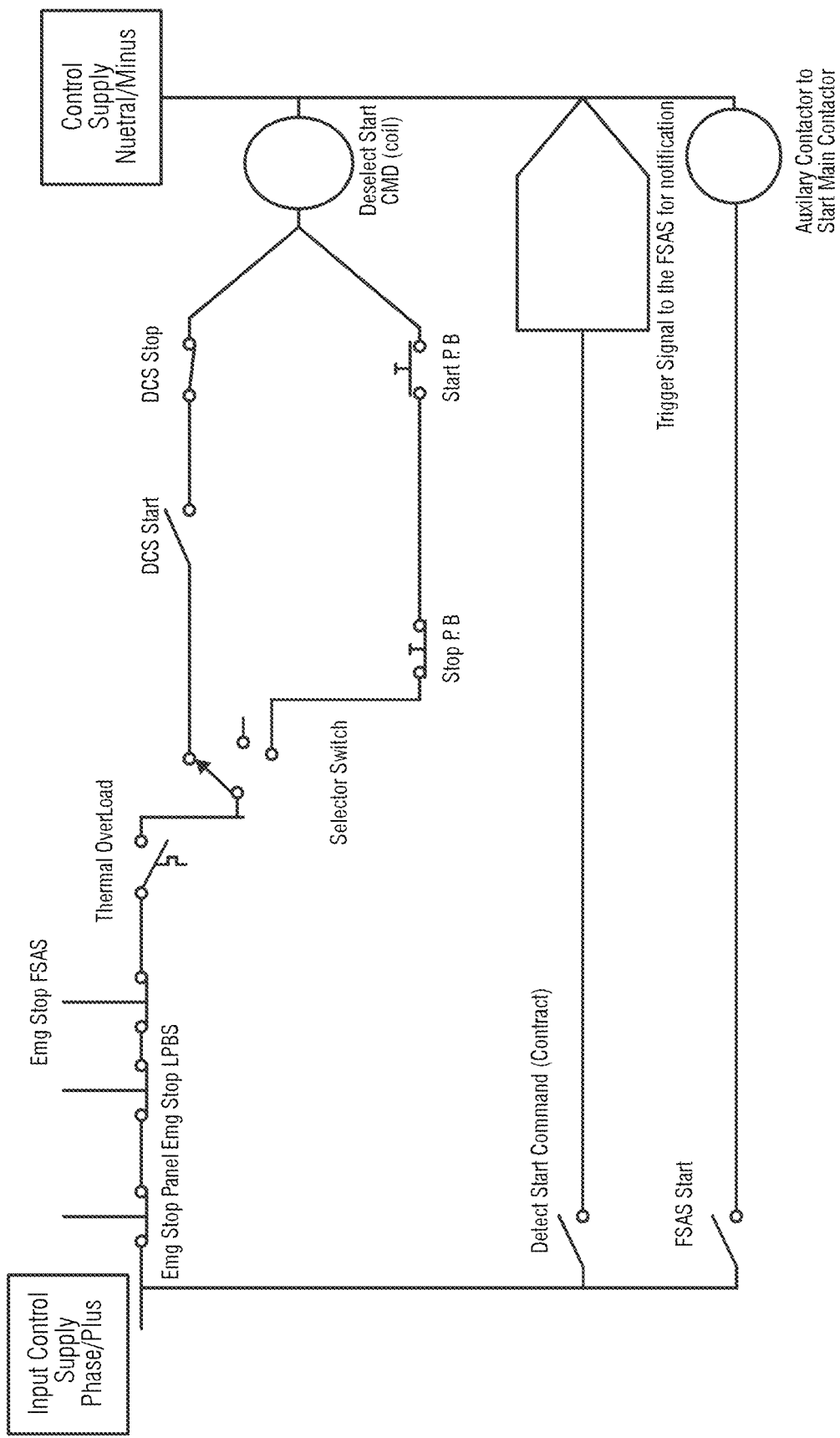

FIGS. 4A-B show an electrical circuit layout 400 illustrating a method of managing operations of a field device 108A-N, according to an embodiment. In FIG. 4A, a conventional control circuit of a direct in line (DOL) type feeder that may be controlled by DCS or LPBS is depicted. In conventional control systems, the MCC/PCC/SCS is controlled via distributed control system (e.g., engineering systems 128A-N) or using local panels. Power is delivered to the field device 108A-N based on the control commands. In FIG. 4B, a typical control circuit of a DOL type feeder with the operational safety management module 118 is depicted. The circuit now has an add-on coil that is used for sending a trigger signal to the operational safety management module 118 for triggering notifications or control signals. If the users accept the request within a stipulated amount of time, then the operational safety management module 118 actuates a "NO-Contact" that may excite the auxiliary contactor to energize the main contactor, which starts the field device 108A-N. The operational safety management module 118 evaluates the control signals generated. The operational safety management module 118 communicates with the MCC/PCC/SCS systems 110A-N directly and delivers command (e.g., healthy or e-stop). Each time the engineering systems 128A-N or the LPBS 112A-N tries to deliver the generated control signal to the MCC/PCC/SCS systems 110A-N, a notification is sent to the operational safety management module 118, which then validates the control signals, for example, whether to start the field device 108A-N or not; then, if the validation is successful, the control signal is delivered to the MCC/PCC/SCS systems 110A-N to, for example, start the field device 108A-N.

Figure 5:
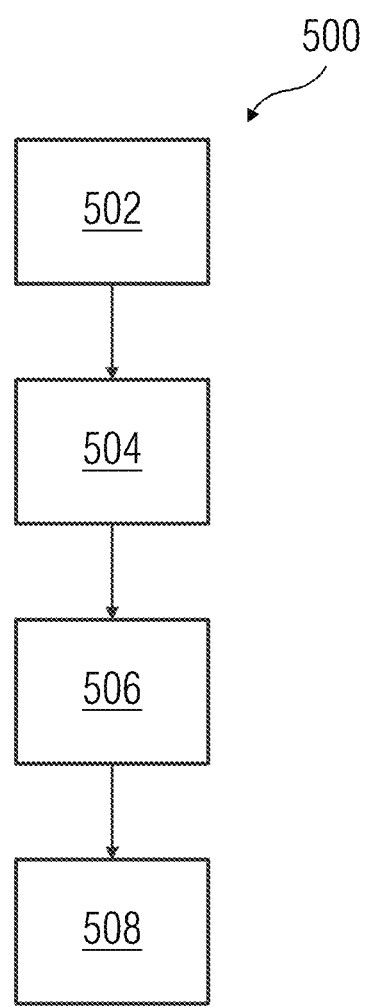
FIG. 5 is a process flowchart illustrating an exemplary method of managing operations of a field device in an industrial environment, according to an embodiment.

FIG. 5 is a process flowchart illustrating an exemplary method 500 of managing operations of a field device 108A-N in an industrial environment 100, according to an embodiment. At act 502, a request to operate a field device 108A-N is received from one or more data sources. The request includes information associated with the field device 108A-N, requestor information, and at least one operation command to be executed on the field device 108A-N. At act 504, one or more control signals to operate the field device 108A-N are generated based on the received request.

At act 506, the generated one or more control signals are validated based on information related to the field device 108A-N and proximity of one or more objects 114A-N with respect to location of the field device 108A-N. At act 508, the generated one or more control signals are output to at least one of the field device 108A-N via a network 104 based on successful validation of the one or more control signals. The outputted one or more control signals operate the field device 108A-N as requested.

FIG. 6 is a process flowchart illustrating an exemplary method 600 of managing operations of a field device 108A-N in an industrial environment 100, according to another embodiment. Specifically, FIG. 6 depicts the validation process. At act 602, a validation process of one or more control signals is initiated. At act 604, a location confirmation request is broadcast to at least one object 114A-N having a location that is determined to be in proximity to the location of the field device 108A-N. This occurs when the control signals are generated based on the request received. At act 606, a timer is initiated and determined whether the timer is lapsed. If the time is lapsed, then at act 624, the control signals are discarded, and the request is canceled. If the timer is not lapsed, then at act 608, it is determined whether there exists at least one interlock function associated with the field device 108A-N based on a prestored lookup table. If there exists at least one interlock function, then at act 624, the generated control signal is discarded, and the request is canceled. If there is no interlock function, then at act 610, it is further determined whether any new objects 114A-N enters the vicinity of the field device. Subsequently, at act 612, it is further determined whether any existing objects 114A-N exits the vicinity of the field device 108A-N. In case any existing objects 114A-N exits the vicinity of the field device 108A-N, then at act 614, the broadcasted location confirmation request is cancelled.

In case a new object 114A-N enters the vicinity of the field device 108A-N, then at act 616, a location confirmation request is broadcast to the new objects 114A-N. At act 618, it is determined whether new objects 114A-N and existing objects 114A-N accept the broadcasted location confirmation request. In case the request is not accepted, then at act 620, it is determined whether there is any decline of the request. If not, then the process is repeated from 606. Further, if it is determined that there is at least one decline of the request, then at act 624, the control signals are now canceled, and the request is discarded.

At act 618, if all new objects 114A-N and existing objects 114A-N accept the broadcasted location confirmation request, then at act 622, the control signals are said to be successfully validated.

The present embodiments may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be an electronic, magnetic, optical, electromagnetic, infrared, or semiconductor system (or apparatus or device). Propagation mediums in and of themselves as signal carriers are not included in the definition of physical computer-readable medium. The physical computer-readable medium may include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology may be centralized or distributed (or a combination thereof) as known to those skilled in the art.

While the present invention has been described in detail with reference to certain embodiments, it should be appreciated that the present invention is not limited to those embodiments. In view of the present disclosure, many modifications and variations would present themselves to those skilled in the art without departing from the scope of the various embodiments of the present invention, as described herein. The scope of the present invention is, therefore, indicated by the following claims rather than by the foregoing description. All changes, modifications, and variations coming within the meaning and range of equivalency of the claims are to be considered within their scope. All advantageous embodiments claimed in method claims may also be apply to system and apparatus claims.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for securely managing operations of a field device in an industrial environment, the method comprising:
receiving, by a processor, a request to operate the field device from one or more data sources;
generating, by the processor, one or more control signals to operate the field device based on the received request;
validating, by the processor, the generated one or more control signals based on information related to the field device and proximity of one or more objects with respect to a location of the field device, the validating comprising:
    determining a location of one or more objects in proximity to the location of the field device;
    validating whether the determined location of at least one object of the one or more objects is in proximity to the location of the field device; and
    generating a validation failure message when the location of the at least one object is in proximity to the location of the field device; and
outputting, by the processor, the generated one or more control signals to the field device via a network based on successful validation of the one or more control signals,
wherein determining the location of the one or more objects in proximity to the location of the field device comprises:
    receiving real-time location information associated with each object of the one or more objects present in a technical installation at a given time;
    generating a geographical map of the technical installation, the geographical map comprising locations of one or more field devices;
    superimposing received location information associated with each object of the one or more objects present in the technical installation at the given time onto the generated geographical map of the technical installation;
    mapping locations of each object of the one or more objects to corresponding locations of the one or more field devices based on vicinity; and
    determining locations of the one or more objects in proximity to the location of the field device of the one or more field devices based on the mapping.

2. The method of claim 1, further comprising:
controlling the operation of the field device based on the generated one or more control signals.

3. The method of claim 1, further comprising:
halting operations of the field device when the validation of the one or more control signals fails; and
discarding the received request to operate the field device.

4. The method of claim 1, wherein generating the one or more control signals to operate the field device based on the received request comprises:
    detecting one or more events triggered corresponding to the operation of the field device;
    determining whether the detected one or more events require validation of operations of the field device; and
    generating one or more control signals corresponding to the detected one or more events when the detected one or more events require validation of operations of the field device.

5. The method of claim 1, wherein the request comprises information associated with the field device, requestor information, and at least one operation command to be executed on the field device.

6. The method of claim 1, further comprising:
generating a validation success message when the validation of the determined location of the at least one object in proximity to the location of the field device is successful.

7. The method of claim 1, wherein validating the generated one or more control signals based on information related to the field device and proximity of one or more operators with respect to location of the field device comprises:
    determining whether at least one interlock function associated with the field device exists based on a prestored lookup table; and
    generating a validation failure message when at least one interlock function associated with the field device exists and when the location of the at least one object is in proximity to the location of the field device.

8. The method of claim 1, further comprising:
generating a validation success message when at least one interlock function associated with the field device does not exist and when the location of the at least one object is not in proximity to the location of the field device.

9. The method of claim 1, wherein validating whether the determined location of at least one object is in proximity to the location of the field device comprises:
    broadcasting a location confirmation request to the at least one object having a location that is determined to be in proximity to the location of the field device;
    receiving a response message from the broadcasted at least one object, wherein the response message comprises at least one location acceptance or location rejection message;
    determining whether the received response message comprises a location acceptance message; and
    successfully validating the determined location of the at least one object in proximity to the location of the field device when the received response message comprises a location acceptance message.

10. The method of claim 9, further comprising:
generating a validation failure message when the received response message comprises a location rejection message; and
discarding the generated one or more control signals and the received request upon generating the validation failure message.

11. A cloud computing system for securely managing operations of a field device in an industrial environment, the cloud computing system comprising:
    one or more processors; and
    a memory coupled to the one or more processors, the memory comprising an operational safety management module stored in the form of machine-readable instructions executable by the one or more processors to securely manage operations of a field device in an industrial environment, the machine-readable instructions comprising:
        receiving, by the one or more processors, a request to operate the field device from one or more data sources;
        generating, by the one or more processors, one or more control signals to operate the field device based on the received request;
        validating, by the one or more processors, the generated one or more control signals based on information related to the field device and proximity of one or more objects with respect to a location of the field device, the validating comprising:
            determining a location of one or more objects in proximity to the location of the field device;
            validating whether the determined location of at least one object of the one or more objects is in proximity to the location of the field device; and
            generating a validation failure message when the location of the at least one object is in proximity to the location of the field device; and
        outputting, by the one or more processors, the generated one or more control signals to the field device via a network based on successful validation of the one or more control signals, wherein determining the location of the one or more objects in proximity to the location of the field device comprises:

receiving real-time location information associated with each object of the one or more objects present in a technical installation at a given time;

generating a geographical map of the technical installation, the geographical map comprising locations of one or more field devices;

superimposing received location information associated with each object of the one or more objects present in the technical installation at the given time onto the generated geographical map of the technical installation;

mapping locations of each object of the one or more objects to corresponding locations of the one or more field devices based on vicinity; and determining locations of the one or more objects in proximity to the location of the field device of the one or more field devices based on the mapping.

12. A non-transitory computer-readable storage medium that stores machine-readable instructions executable by one or more processors to securely manage operations of a field device in an industrial environment, the machine-readable instructions comprising:

receiving, by the one or more processors, a request to operate the field device from one or more data sources;

generating, by the one or more processors, one or more control signals to operate the field device based on the received request;

validating, by the one or more processors, the generated one or more control signals based on information related to the field device and proximity of one or more objects with respect to a location of the field device, the validating comprising:

determining a location of one or more objects in proximity to the location of the field device;

validating whether the determined location of at least one object of the one or more objects is in proximity to the location of the field device; and generating a validation failure message when the location of the at least one object is in proximity to the location of the field device; and outputting, by the one or more processors, the generated one or more control signals to the field device via a network based on successful validation of the one or more control signals, wherein determining the location of the one or more objects in proximity to the location of the field device comprises:

receiving real-time location information associated with each object of the one or more objects present in a technical installation at a given time;

generating a geographical map of the technical installation, the geographical map comprising locations of one or more field devices;

superimposing received location information associated with each object of the one or more objects present in the technical installation at the given time onto the generated geographical map of the technical installation;

mapping locations of each object of the one or more objects to corresponding locations of the one or more field devices based on vicinity; and determining locations of the one or more objects in proximity to the location of the field device of the one or more field devices based on the mapping.

* * * * *